US012561367B1

(12) United States Patent
Xu et al.

(10) Patent No.: US 12,561,367 B1
(45) Date of Patent: Feb. 24, 2026

(54) ENHANCED MACHINE LEARNING-BASED MICRO-CATEGORY GENERATION

(71) Applicant: Amazon Technologies, Inc., Seattle, WA (US)

(72) Inventors: Caizhi Xu, Seattle, WA (US); Ravi Shankar, Seattle, WA (US); Brian William Beisel, New York, NY (US); Gabriel Miller, New York, NY (US); Cody Severinski, Seattle, WA (US); Jamal Alikhani, Seattle, WA (US); Jose A. Sepulveda, Seattle, WA (US); Brian Robert Swickline, Seattle, WA (US); Fei Wang, Sunnyvale, CA (US); Hani Suleiman, New York, NY (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/657,738

(22) Filed: May 7, 2024

(51) Int. Cl.
| | |
|---|---|
| *G06F 16/738* | (2019.01) |
| *G06F 16/732* | (2019.01) |
| *G06F 16/735* | (2019.01) |
| *G06F 16/75* | (2019.01) |

(52) U.S. Cl.
CPC ........ *G06F 16/738* (2019.01); *G06F 16/7343* (2019.01); *G06F 16/735* (2019.01); *G06F 16/75* (2019.01)

(58) Field of Classification Search
CPC .. G06F 16/738; G06F 16/7343; G06F 16/735; G06F 16/75
See application file for complete search history.

(56) References Cited

U.S. PATENT DOCUMENTS

| | | | | |
|---|---|---|---|---|
| 10,678,823 B2* | 6/2020 | Tacchi | ................. | G06N 5/022 |
| 11,917,245 B2* | 2/2024 | Phillips | ................. | G06N 5/01 |
| 12,259,921 B1* | 3/2025 | Guriel | ................. | G06F 16/45 |
| 2015/0310011 A1* | 10/2015 | Poulet | ................. | G06F 16/433 |
| | | | | 707/722 |

(Continued)

OTHER PUBLICATIONS

Santos et al, "Requirements Satisfiability with In-Context Learning", Apr. 19, 2024, IEEE, pp. 1-15 (Year: 2024).*

(Continued)

*Primary Examiner* — Jared M Bibbee
(74) *Attorney, Agent, or Firm* — Eversheds Sutherland (US) LLP

(57) ABSTRACT

Devices, systems, and methods for machine learning-based micro-category generation may include a method including identifying, for a respective cluster of content titles or items, a top-K most representative group of the content titles or items; generating, by a machine learning model, based on a first input prompt, the common theme of the top-K most representative group; generating, by the machine learning model, based on the second input prompt and filtering, a group of content titles or items matching the common theme; generating, by the machine learning model, based on a third input prompt, a name for the group of content titles or items matching the common theme; and presenting the group of content titles or items matching the common theme and the name for the group of content titles or items matching the common theme via a user interface of a streaming media application.

20 Claims, 6 Drawing Sheets

(56) References Cited

U.S. PATENT DOCUMENTS

| | | | |
|---|---|---|---|
| 2023/0177834 A1* | 6/2023 | Griffin | G06V 20/46 |
| | | | 382/159 |
| 2023/0402065 A1* | 12/2023 | Gu | G11B 27/34 |
| 2024/0012924 A1* | 1/2024 | Kidd | G06F 40/216 |
| 2024/0386046 A1* | 11/2024 | Leach | G06F 16/953 |
| 2024/0406521 A1* | 12/2024 | Ramesh | H04N 21/8549 |

OTHER PUBLICATIONS

L. Ouyang, J. Wu, X. Jiang, D. Almeida, C. L. Wainwright, P. Mishkin, C. Zhang, S. Agarwal, K. Slama, A. Ray, J. Schulman, J. Hilton, F. Kelton, L. Miller, M. Simens, A. Askell, P. Welinder, P. Christiano, J. Leike, and R. Lowe. Training language models to follow instructions with human feedback, 2022.
C. Wu, W. Lin, X. Zhang, Y. Zhang, Y. Wang, and W. Xie. Pmc-llama: Towards building open-source language models for medicine, 2023.
D. Araci. Finbert: Financial sentiment analysis with pre-trained language models, 2019.
R. Taori, I. Gulrajani, T. Zhang, Y. Dubois, X. Li, C. Guestrin, P. Liang, and T. B. Hashimoto. Stanford alpaca: An instruction-following llama model. https://github.com/tatsu-lab/stanford_alpaca, 2023.
E. J. Hu, Y. Shen, P. Wallis, Z. Allen-Zhu, Y. Li, S. Wang, L. Wang, and W. Chen. Lora: Low-rank adaptation of large language models, 2021.
J. Wei, X. Wang, D. Schuurmans, M. Bosma, B. Ichter, F. Xia, E. Chi, Q. Le, and D. Zhou. Chain-of-thought prompting elicits reasoning in large language models, 2023.
J. Liu, A. Liu, X. Lu, S. Welleck, P. West, R. Le Bras, Y. Choi, and H. Hajishirzi. Generated knowledge prompting for commonsense reasoning. In Proceedings of the 60th Annual Meeting of the Association for Computational Linguistics (vol. 1: Long Papers), pp. 3154-3169, Dublin, Ireland, May 2022. Association for Computational Linguistics.
P. Clark, O. Tafjord, and K. Richardson. Transformers as soft reasoners over language. In Proceedings of the Twenty-Ninth International Joint Conference on Artificial Intelligence, IJCAI'20, 2021.
F. M. Harper and J. A. Konstan. The movielens datasets: History and context. ACM Trans. Interact. Intell. Syst., 5(4), Dec. 2015.
A. Hollocou, T. Bonald, and M. Lelarge. Modularity-based sparse soft graph clustering. In The 22nd International Conference on Artificial Intelligence and Statistics, pp. 323-332. PMLR, 2019.
N. Reimers and I. Gurevych. Sentence-bert: Sentence embeddings using siamese bert-networks. In Proceedings of the 2019 Conference on Empirical Methods in Natural Language Processing. Association for Computational Linguistics, 11 2019.
M. Grusky. Rogue scores. In Proceedings of the 61st Annual Meeting of the Association for Computational Linguistics (vol. 1: Long Papers), pp. 1914-1934, 2023.
Claude 2—anthropic.com. https://www.anthropic.com/index/claude-2. [Accessed Sep. 19, 2023].
M. N. Team. Introducing mpt-30b: Raising the bar for open-source foundation models, 2023. Accessed: Jun. 22, 2023.

* cited by examiner

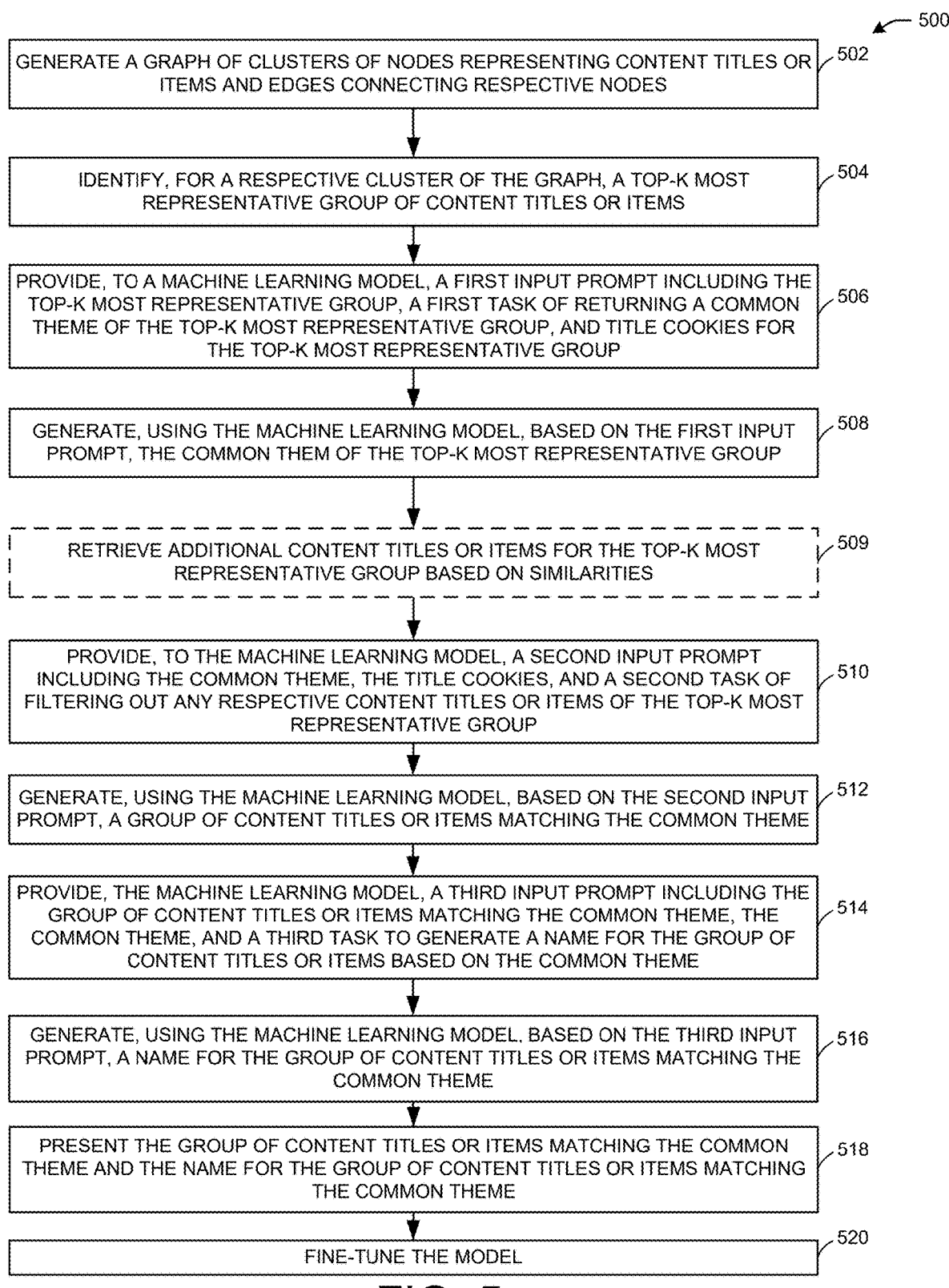

500

GENERATE A GRAPH OF CLUSTERS OF NODES REPRESENTING CONTENT TITLES OR ITEMS AND EDGES CONNECTING RESPECTIVE NODES ⌐502

IDENTIFY, FOR A RESPECTIVE CLUSTER OF THE GRAPH, A TOP-K MOST REPRESENTATIVE GROUP OF CONTENT TITLES OR ITEMS ⌐504

PROVIDE, TO A MACHINE LEARNING MODEL, A FIRST INPUT PROMPT INCLUDING THE TOP-K MOST REPRESENTATIVE GROUP, A FIRST TASK OF RETURNING A COMMON THEME OF THE TOP-K MOST REPRESENTATIVE GROUP, AND TITLE COOKIES FOR THE TOP-K MOST REPRESENTATIVE GROUP ⌐506

GENERATE, USING THE MACHINE LEARNING MODEL, BASED ON THE FIRST INPUT PROMPT, THE COMMON THEM OF THE TOP-K MOST REPRESENTATIVE GROUP ⌐508

RETRIEVE ADDITIONAL CONTENT TITLES OR ITEMS FOR THE TOP-K MOST REPRESENTATIVE GROUP BASED ON SIMILARITIES ⌐509

PROVIDE, TO THE MACHINE LEARNING MODEL, A SECOND INPUT PROMPT INCLUDING THE COMMON THEME, THE TITLE COOKIES, AND A SECOND TASK OF FILTERING OUT ANY RESPECTIVE CONTENT TITLES OR ITEMS OF THE TOP-K MOST REPRESENTATIVE GROUP ⌐510

GENERATE, USING THE MACHINE LEARNING MODEL, BASED ON THE SECOND INPUT PROMPT, A GROUP OF CONTENT TITLES OR ITEMS MATCHING THE COMMON THEME ⌐512

PROVIDE, THE MACHINE LEARNING MODEL, A THIRD INPUT PROMPT INCLUDING THE GROUP OF CONTENT TITLES OR ITEMS MATCHING THE COMMON THEME, THE COMMON THEME, AND A THIRD TASK TO GENERATE A NAME FOR THE GROUP OF CONTENT TITLES OR ITEMS BASED ON THE COMMON THEME ⌐514

GENERATE, USING THE MACHINE LEARNING MODEL, BASED ON THE THIRD INPUT PROMPT, A NAME FOR THE GROUP OF CONTENT TITLES OR ITEMS MATCHING THE COMMON THEME ⌐516

PRESENT THE GROUP OF CONTENT TITLES OR ITEMS MATCHING THE COMMON THEME AND THE NAME FOR THE GROUP OF CONTENT TITLES OR ITEMS MATCHING THE COMMON THEME ⌐518

FINE-TUNE THE MODEL ⌐520

602 — HARDWARE PROCESSOR
624 — INSTRUCTIONS

604 — MAIN MEMORY
624 — INSTRUCTIONS

606 — STATIC MEMORY
624 — INSTRUCTIONS

628 — SENSORS

620 — NETWORK INTERFACE

630 — ANTENNA(S)

GRAPHICS DISPLAY DEVICE — 610

INPUT DEVICE — 612

UI NAVIGATION DEVICE — 614

STORAGE DEVICE — 616
MACHINE-READABLE MEDIUM — 622
INSTRUCTIONS — 624

SIGNAL GENERATION DEVICE — 618

MICRO-CATEGORY MODULES — 619

POWER DEVICE — 632

608

OUTPUT CONTROLLER — 634

626 — COMMUNICATIONS NETWORK

ENHANCED MACHINE LEARNING-BASED MICRO-CATEGORY GENERATION

BACKGROUND

Because content and items are selected to be presented to users in user interfaces, categorizing the content and items can help users identify content, items of interest, and their characteristics. However, some categories used to describe content and items to a user may be too generic, and as a result, too many content titles and items may fall under a given category, and the categories may be irrelevant to user's personal preferences. There is currently not a machine learning framework to generate micro-categories for content and items.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flow for an example process for machine-learning based micro-category generation, in accordance with one or more embodiments of the present disclosure.

Figure 1:
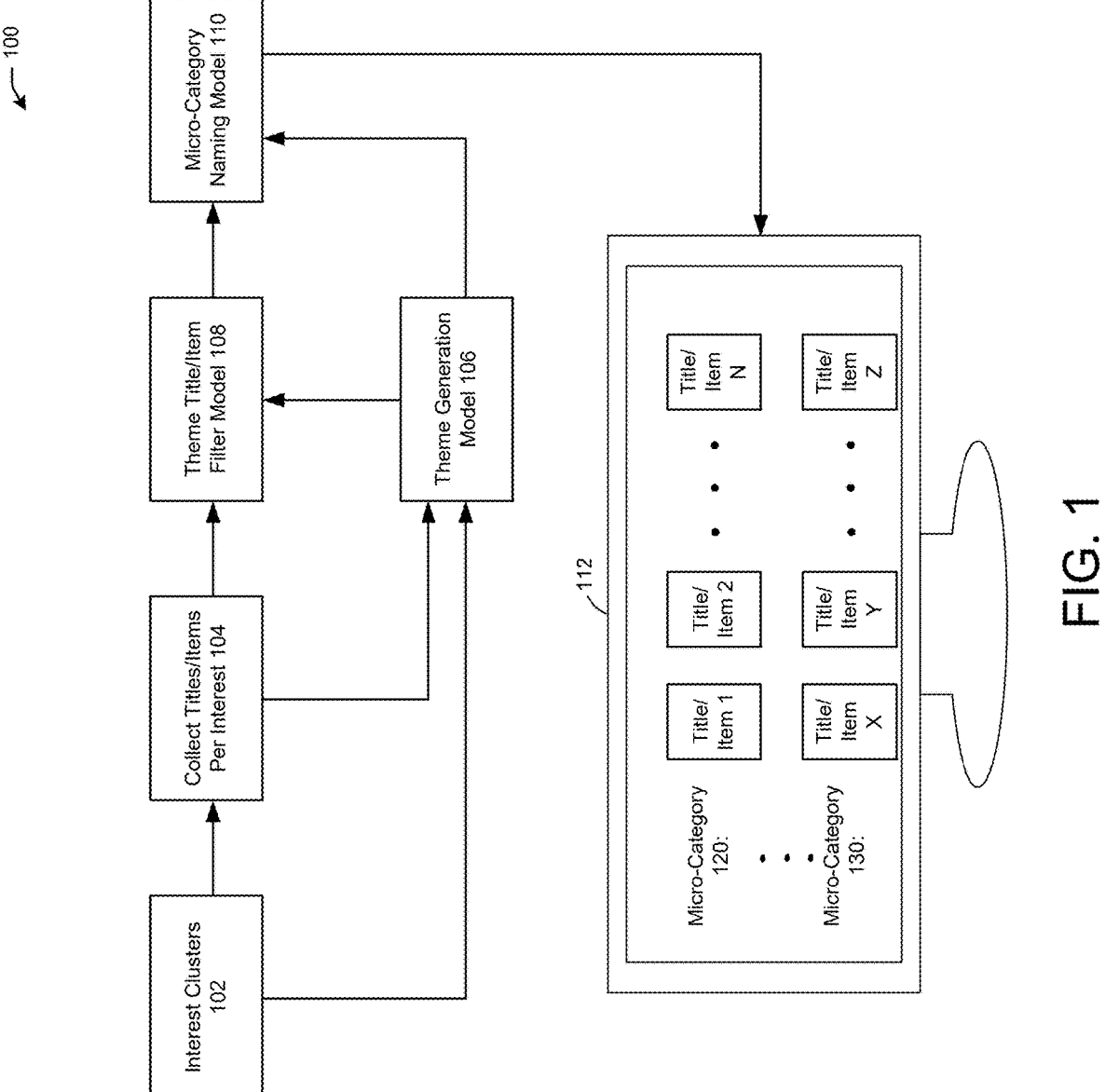
FIG. 1 illustrates an example system for machine-learning based micro-category generation, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced machine-learning based micro-category generation.

When a user visits a user interface that presents available content for presentation or items to select for purchase, the content and items may be categorized in a manner that allows the users to search among pre-curated subsets of content and items. For example, a video streaming application may organize video titles (e.g., movies, television series, documentaries, etc.) into categories such as drama, action, comedy, and the like. A music streaming application may organize music titles into categories such as pop, classical, country, and the like. An audio book application may organize audio books into categories such as mystery, romance, thrillers, and the like. An online marketplace may organize items for sale into categories such as kitchen, lawn and garden, clothing and apparel, and the like. Such categories may include too many titles for a user to navigate, and because the categories may be so broad, many titles may not fit particularly well within them. For example, a horror movie with some funny jokes may be categorized under both horror and comedy, even though the movie is not really a comedy.

Some content providers have begun using more specific sub-categories, or micro-genres, to describe content, and those micro-genres can be very specific. Micro-genres (or other micro-categories) are groupings of titles (or items) that represent niche interests and are thematically rooted, such as action-packed thriller titles, tearjerker romance titles, and the like. To generate the specific micro-categories, existing techniques lack adequate tools to create specific micro-genre categories.

A machine learning model that evaluates language, such as a large language model (LLM), may evaluate content titles and items for sale using one or more embodiments of the present disclosure. The enhanced approach herein improves the accuracy and quality of the micro categories and their names by analyzing large quantities of data quickly, identifying patterns and trends that otherwise may not be noticed and therefore may not be accounted for in micro categories. The accuracy and consistency of the micro categories may be improved by allowing titles and items to be better associated with a more correct (e.g., relevant) micro category. In addition, the micro categories may be customized and personalized in an improved manner. The use of the machine learning herein provides an improved definition of inputs and outputs using few-shot chain-of-thought (CoT) prompting (e.g., to guide the machine learning to articulate its reasoning, which involves a series of intermediate steps leading to an improved final conclusion), a defined output structure, and an analysis of data related to the content titles and items for sale without requiring the model to actually consume and evaluate video and audio frames (e.g., consuming significant computing resources_, without requiring human viewers to generate tags, and without relying on pre-selected categories or characteristics. The machine learning-based micro-category generation herein also may leverage the machine learning to generate names for the generated micro-genres (or other sub-categories). As a result, an enhanced machine learning-based approach to micro-genre (and other micro-category) generation is provided herein and creates a connection between a user and the machine learning model based on user preferences.

In addition, language models are generally not strong at reasoning, so applying a language model to micro-category generation poses challenges unique to language models that the present disclosure solves.

In one or more embodiments, content titles and items may be grouped into clusters based on their similarities to one another. The clusters may represent seeds for the micro-category generation. To generate the clusters, content titles that are frequently consumed together (or items frequently purchased together) may be grouped into a cluster using a graph-based clustering algorithm. In the graph, each node may represent a content title or item, and each edge connecting respective nodes may be weighted by a similarity score learned from an embedding model (e.g., trained using consumption/purchase history). There is no pre-set number of clusters, each representing an interest, to generate, so the interests represented by the clusters do not need to be preset. Because co-consumption and co-purchase data may change regularly, the similarities between co-consumed content and co-purchased items may change over time. A non-parametric community detection algorithm may be applied to allow for sparse soft-assignment without pre-specifying the number of clusters to generate. To account for the volatility, a pre-processing step for the graph may smooth the edge weights over time using time-decayed smoothing. To avoid noise from behavior data, a subset of representative content titles or items from a cluster may be selected for the cluster based on how close they are to the center of the cluster.

In one or more embodiments, the representative titles or items in a cluster (e.g., closest to the center of a cluster) may represent seeds provided to a machine learning language model (e.g., LLM) to generate and name a theme (e.g., micro-category). For a given interest cluster, the top-K most representative titles or items may be provided in a prompt to the model, reducing noise from tail items in a cluster (e.g., furthest from the center of a cluster) and limiting prompt length. To extract representative themes from a cluster, the model needs sufficient knowledge about the representative titles or items in the cluster, and needs to understand what a theme means for a given domain, whether video titles, audio titles, items, etc. To provide knowledge for the seeds, textual data (e.g., cookie data or other type of data in a textual document) may be appended to the theme generation prompt to the model. The textual data provided in the input prompt may be information that the model does not have (e.g., from model training data or other data that the model may access without an input prompt providing the data), and therefore may supplement the knowledge that the model has.

In one or more embodiments, title information, such as a title or item cookie or other form of textual information for a title or item, may include information such as a title or item name, a release year (for titles), a synopsis (for titles), and an item description (for items). The synopsis or item description may provide enough text data for the model to understand the semantics of a title or item. To help the model understand what a theme means, the prompt may include instructions. For example, for a video title theme prompt, the theme may include elements such as cultural context, topic, sub-genre, country of origin, mood, and unique character characteristics. An example video title prompt may be as follows:

"Pretend that you are a movie and television critic. Your task is to return a common underlying theme for a list of titles. The theme may include elements such as cultural context, topic, sub-genre, country of origin, mood, and unique character characteristics. The list of titles is below. Each title has a name, release year, and synopsis. If these titles share a common sub-genre or similar culture context, please highlight it. Otherwise, no need to mention it. Please be as specific as possible without totally discounting one of the given titles. If you are too general, you will miss what truly connects these titles. {title_cookie_1, title_cookie_2, . . . , title_cookie_K}."

In one or more embodiments, given a micro-category theme and a title or product, a task for the model is to determine if a title or item matches the theme. A micro-category theme may cover various aspects of a title or item.

To derive an answer, the language model may need to compare the theme to the title or item and evaluate for a match in terms of the aspects of the theme. This is a non-trivial reasoning task at which language models often struggle. The model's response may be binary (e.g., true or false), or a rating score (e.g., 0-4 where 0 indicates no match and 4 indicates a perfect match). When the response is false or below a score threshold for a given title or item, the given title or item may be filtered out from the micro-category. To assist the model in this reasoning task, cookie data and theme elements may be appended in the prompt to help the model understand the task. For example, a prompt template may be as follows:

"Pretend that you are an expert movie and television critic. Your task is to decide whether a title belongs to a given theme. If the title does not make sense when paired with the theme on a streaming service user interface, please return False. Otherwise, return True. The theme may include elements such as cultural context, topic, sub-genre, old release time period, country of in, character, studio, and mood. The theme and title are provided here. Please return either True or False in your answer. The theme is {theme}. The title (or item) is {title_cookie} (or {item_cookie})."

In one or more embodiments, another task of the model is to generate a representative name for a micro-category. The name should be reflective of the theme for the micro-category, and catchy to users. Multiple names may be generated by the model as candidates for a given micro-category. The prompt template may be as follows:

"Theme: {theme}. Pretend that you are a film critic in the entertainment industry. Please provide a catchy name that would serve well as a title for a group of movies or television shows from this theme on a streaming service interface. Please limit your answer to ten words."

Micro-category names may be directly user-facing, so they should be catchy to users (e.g., consumers of the content or buyers of items), but also meet naming requirements. For example, naming requirements may limit the number of words and characters, may prohibit punctuation marks and/or certain words or phrases, and the like. Language models often struggle with such tasks, so while the naming requirements may be specified in the model prompts, they do not need to be. Instead, a post-processing step may evaluate the candidate names for compliance with the naming requirements. A human operator may select the best of multiple candidate micro-category names. Based on performance feedback, such as whether users select titles or items from a micro-category, a micro-category name may be replaced with another one for the micro-category.

In one or more embodiments, the model prompts may be multi-modal. For example, content titles may be associated with images such as movie/television posters, box art, album covers, and the like. Items may have images showing them. Such images data may be provided with the model prompt in addition to the cookies to allow for both semantic analysis and image context analysis in creating the micro-categories and micro-category names. In some embodiments, ordering the model prompt so that an image is before the text in the prompt may improve performance (e.g., in the filtering task).

In one or more embodiments, a subset of the generated micro-categories may be selected for presentation to a given user. A user interface may not fit every micro-category, and some users may be more likely to select items or titles from some micro-categories instead of from other micro-categories. Given a user's content title consumption or item purchase history, micro-categories may be selected for presentation to the user.

Test results of the enhanced techniques herein show that different prompts result in different effects, some more desirable than others. For example, Table 1 below shows a summary of themes and filter prompts to the model, and how they correlate with various metrics.

TABLE 1

Themes and Filter Prompt Metrics

| Theme | Filter prompt | Metrics (filter step) Precision | Recall | SWC_TP (stream-weighted coverage of titles that are true positives) | Fbeta (beta = 0.5) |
|---|---|---|---|---|---|
| Verbose | Baseline | 0.57 | 0.98 | 1.00 | 0.62 |
| | CoT (text output) | 0.82 | 0.55 | 0.52 | 0.77 |
| | CoT (json output) | 0.72 | 0.89 | 0.89 | 0.79 |
| | Rating method (score threshold = 2) | 0.58 | 0.94 | 1.00 | 0.62 |
| | Rating method (score threshold = 3) | 0.68 | 0.88 | 0.99 | 0.71 |
| | Rating method (score threshold = 4) | 0.83 | 0.04 | 0.00 | 0.16 |
| Succinct theme (ICL prompt) | Baseline | 0.75 | 0.9 | 0.96 | 0.77 |
| | CoT (text output) | 0.78 | 0.78 | 0.72 | 0.78 |
| | CoT (json output) | 0.81 | 0.79 | 0.86 | 0.81 |
| | Rating method (score threshold = 2) | 0.73 | 0.88 | 0.98 | 0.75 |
| | Rating method (score threshold = 3) | 0.85 | 0.71 | 0.63 | 0.82 |
| | Rating method (score threshold = 4) | 1 | 0.01 | 0.00 | 0.07 |

Observations of Table 1 Metrics

Verbose vs. Succinct theme: with a succinct theme, precision is generally improved, whereas recall is generally harmed but acceptable. Because precision may be more desirable than recall, succinct theme is better than verbose theme.

CoT text vs. json: json output version is preferred as it shows improvements for both precision and recall (succinct theme).

CoT_json vs. baseline: CoT_json is preferred due to a higher precision metric.

CoT_json. vs. Rating method: Regarding rating method, an optimal threshold of rating score may be selected to balance precision and recall. Based on the table above, threshold=3 is optimal. Though CoT_json has slightly worse precision metric, it shows much better SWC_TP metric. CoT_json method is preferred.

Based on the metrics and observations for Table 1 above, an ICL (in-context learning) prompt (e.g., when the prompt provides examples of the task) may be preferred for succinct theme generation, and a CoT_json prompt may be used for thematic title filtering.

Referring to the baseline prompt of Table 1 above, an example baseline filtering prompt may be:

"You are an expert movie and TV critic. Your task is to decide whether a title belongs to a given theme. If the title does not make sense when paired with the theme on a streaming service UI, please return False. Otherwise, return True. The theme may include elements such as cultural context, topic, sub-genre, old release time period, country of origin, character, studio, and mood. The theme and title are provided here. Please return either True or False in your answer. The theme is: "Based on the given movie titles, release years, and synopses, it seems these films share a common theme of documenting the history and key figures of baseball, specifically focusing on iconic teams, players, and ballparks. The titles cover a range of baseball subjects, from biopics of star players like Babe Ruth and Lou Gehrig to retrospectives on legendary teams like the Brooklyn Dodgers and New York Yankees. Several films provide nostalgic looks back at historic ballparks like Yankee Stadium and Fenway Park. The docs appear to rely heavily on archival footage and interviews with former players to chronicle baseball's "golden age" from the early 1900s through the 1960s. While a few titles touch on more recent history or take a lighter approach, the overriding theme connecting these films is baseball history and nostalgia, bringing to life the stories, achievements and mythos surrounding the game's most celebrated teams, players and eras. Key subgenres represented include biopics, team/player profiles, ballpark retrospectives and sports nostalgia. "The title is: Title Name, Title Release Year, Title Synopsis.""

An example CoT prompt may be:

"Question: You are an expert movie and TV critic. Your task is to decide whether a title belongs to a given theme. If the title does not make sense when paired with the theme on a streaming service user interface, it doesn't belong to the theme. The theme may include elements such as cultural context, topic, sub-genre, old release time period, country of origin, character, studio, and mood. The theme and title are provided here. The theme is: "Action-packed thrillers that take place on or around the Christmas holiday. While the main focus of the movie is an action, crime or thriller plot, Christmas should play a minor role to the narrative of the story." The title is: "Title Name: Title Release Year, Title Synopsis." Answer: Yes, the title belongs to the theme of action-packed thrillers that take place on or around the Christmas holiday. While the main focus of the movie is an action-comedy plot, Christmas does play a minor role in the narrative. The synopsis mentions Chris Cringle, also known as Santa Claus, being forced into a partnership and getting locked into a battle of wits. The mention of Chris Cringle and the Christmas-related elements indicate that the movie is set during the Christmas holiday, aligning with the theme."

An example json (JavaScript Object Notation) prompt may be:

"You are an expert movie and tv critic. Your task is to decide whether a title belongs to a given theme. If the title does not make sense when paired with the theme on a streaming service UI, it doesn't belong to the theme. The theme may include elements such as cultural context, topic, sub-genre, old release time period, country of origin, character, studio, and mood. Please provide your response in a json format as shown in the examples below. The schema of the json is {" decision ": "string", "reason": "string"}. Example 1—input: The theme is: "Action-packed thrillers that take place on or around the Christmas holiday. While the main focus of the movie is an action, crime or thriller plot, Christmas should play a minor role to the narrative of the story." The title is: "Title Name, Title Release Year, Title Synopsis." Output: {"decision": "Yes", "reason": "The title belongs to the theme of action-packed thrillers that take place on or around the Christmas holiday. While the main focus of the movie is an action-comedy plot, Christmas does play a minor role in the narrative. The synopsis mentions Chris Cringle, also known as Santa Claus, being forced into a partnership and getting locked into a battle of wits. The mention of Chris Cringle and the Christmas-related elements indicate that the movie is set during the Christmas holiday, aligning with the theme."}."

An example rating method prompt may be:

"You are an expert movie and TV critic. Your task is to classify how close a title is to a given theme. 0 means the title does not exhibit anything from the theme at all, 1 means the title had only a minor alignment with the essence of the theme, 2 means the title is moderately aligned with the essence of the theme, 3 means the title is majorly aligned with the essence of the theme and 4 means the title exhibits all the elements of the theme. The theme may include elements such as cultural context, topic, sub-genre, old release time period, country of origin, character, studio, and mood. The theme and title are provided here. Provide your output in the following json format: {"classificationCategory": "<fill in your categorization here>", "reason": "explain your reason here"}. The theme is: "Based on the given movie titles, synopses, and release years, it seems these films share a common theme of documenting the history and folklore of baseball in the United States, with a particular focus on iconic teams, players, and ball-parks. Some more specific shared elements I noticed: —Several titles focus on the history of legendary MLB teams like the New York Yankees, Brooklyn Dodgers, and Boston Red Sox. —Multiple films highlight star players like Babe Ruth, Lou Gehrig, Ted Williams, and Reggie Jackson. —A few document the history of classic ballparks like Yankee Stadium and Fenway Park. —Most are nostalgic, reverent looks back at baseball's "golden age" from the early 1900s through the 1960s/70s. —The niche sub-genre seems to be baseball history documentaries, with a mix of biographical films, team histories, ballpark retrospectives, and folklore. Overall, baseball history, especially the legends and lore surrounding major teams, players, and stadiums, seems to be the common thread connecting these documentary titles. The niche is celebratory films looking back fondly on baseball's past glories."

Additional test results for multi-modal prompts in the enhanced techniques herein are shown below in Table 2.

TABLE 2

| | | Prompt Modality Metrics | | | |
| --- | --- | --- | --- | --- | --- |
| Prompt modality | Filter prompt | Metrics (filter step) Precision | Recall | SWC_TP* | Fbeta (0.5) |
| text only | Baseline | 0.7 | 0.98 | 1.00 | 0.74 |
| | 3-shot CoT_json | 0.76 | 0.96 | 0.99 | 0.80 |
| | zero-shot CoT_json | 0.77 | 0.96 | 0.99 | 0.80 |
| text + image | v1 (zero-shot) | 0.79 | 0.99 | 1.00 | 0.83 |
| | v2 (zero-shot)** | 0.85 | 0.95 | 0.99 | 0.87 |
| | v4 (3-shot) | 0.83 | 0.96 | 0.99 | 0.86 |

Observations of Table 2 Metrics

Text-only prompt: With zero-shot CoT prompt, the model shows similar metrics as the 3-shot version used in production. The reason why 3-shot prompt does not show any improvement might be that the 3-shot exemplars are not selected for the model.

Multimodal (text+image) vs. text-only: Both v1 and v2 of multimodal prompt shows improvements compared to text-only prompt. Especially, v2 helps improve precision from 77% to 85% without harming recall metric. This demonstrates that multimodal prompt does help improve title filter task significantly.

Image placement (v1 vs. v2): As mentioned earlier, image placement in the prompt matters. Compared to v1 prompt, image data is placed later in the v2. In terms of performance, v2 shows better precision (79% vs. 85%), slightly worse recall (99% vs. 95%) and nearly identical SWC_TP (100% vs. 99%). Therefore, v2 is preferred over v1.

Few-shot multimodal prompt: Similar to text-only prompt, few-shot multimodal prompt does not perform better than zero-shot. The hypothesis is similar, the exemplars are not optimized for the model.

As a result, the recommended model prompts may be multi-modal for the thematic title/item filter task because of improved precision and recall metrics.

Image data in the prompts allow the model to pay attention to key details about a title or item, which improves the model's reasoning for title filtering.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for machine-learning based micro-category generation in accordance with one or more embodiments of the present disclosure.

Referring to FIG. 1, the system 100 may include interest clusters 102, a collection of titles/items per interest 104, and machine learning models, such as a theme generation model 106, a theme title/item filter model 108, and a micro-category naming model 110. The machine learning models may be language models, such as LLMs, for example. A result of the machine learning-based micro-category generation may be presentation (e.g., via a device 112) of micro-categories (e.g., micro-category 120, . . . , micro-category 130) and their titles/items (e.g., title/item 1, title/item 2, . . . , title/item N; and title/item X, title/item Y, . . . , title/item Z) as categorized and named by the machine learning.

In one or more embodiments, content titles (e.g., title/item 1, title/item 2, . . . , title/item N; and title/item X, title/item Y, . . . , title/item Z) and items may be grouped into the interest clusters 102 based on their similarities to one another. The interest clusters 102 may represent seeds for the micro-category generation (e.g., using the theme generation model 106). To generate the interest clusters 102, content titles that are frequently consumed together (or items frequently purchased together) may be grouped into a cluster using a graph-based clustering algorithm. In the graph, each node may represent a content title or item, and each edge connecting respective nodes may be weighted by a similarity score learned from an embedding model (e.g., trained using consumption/purchase history). There is no pre-set number of clusters, each representing an interest, to generate, so the interests represented by the clusters do not need to be preset. Because co-consumption and co-purchase data may change regularly, the similarities between co-consumed content and co-purchased items may change over time. A non-parametric community detection algorithm may be applied to allow for sparse soft-assignment without pre-specifying the number of clusters to generate. To account for the volatility, a pre-processing step for the graph may smooth the edge weights over time using time-decayed smoothing. To avoid noise from behavior data, a subset of representative content titles or items from a cluster may be selected for the cluster based on how close they are to the center of the cluster.

In one or more embodiments, the representative titles or items in a cluster (e.g., closest to the center of a cluster) may represent seeds provided to a machine learning language model (e.g., LLM) to generate and name a theme (e.g., micro-category). For a given interest cluster, the top-K most representative titles (e.g., identified by the collect titles/items per interest 104 step) or items may be provided in a prompt to the theme generation model 106, reducing noise from tail items in a cluster (e.g., furthest from the center of a cluster) and limiting prompt length. To extract representative themes from a cluster, the theme generation model 106 needs sufficient knowledge about the representative titles or items in the cluster, and needs to understand what a theme means for a given domain, whether video titles, audio titles, items, etc. To provide knowledge for the seeds, cookie data may be appended to the theme generation prompt to the theme generation model 106. A title or item cookie may include information such as a title or item name, a release year (for titles), a synopsis (for titles), and an item description (for items). The synopsis or item description may provide enough text data for the theme generation model 106 to understand the semantics of a title or item. To help the theme generation model 106 understand what a theme means, the prompt may include instructions. For example, for a video title theme prompt, the theme may include elements such as cultural context, topic, sub-genre, country of origin, mood, and unique character characteristics.

In one or more embodiments, given a micro-category theme and a title or product, a task for the theme title/item filter model 108 is to determine if a title or item matches the theme generated by the theme generation model 106. A micro-category theme may cover various aspects of a title or item. To derive an answer, the theme title/item filter model 108 may need to compare the theme to the title or item and evaluate for a match in terms of the aspects of the theme. This is a non-trivial reasoning task at which language models often struggle. The theme title/item filter model 108 response may be binary (e.g., true or false), or a rating score (e.g., 0-4 where 0 indicates no match and 4 indicates a perfect match). When the response is false or below a score threshold for a given title or item, the given title or item may be filtered out from the micro-category. To assist the theme title/item filter model 108 in this reasoning task, cookie data and theme elements may be appended in the prompt to help the model understand the task.

In one or more embodiments, a task of the micro-category naming model 110 is to generate a representative name for a micro-category. The name should be reflective of the theme for the micro-category, and catchy to users. Multiple names may be generated by the micro-category naming model 110 as candidates for a given micro-category.

Micro-category names may be directly user-facing, so they should be catchy to users (e.g., consumers of the content or buyers of items), but also meet naming requirements. For example, naming requirements may limit the number of words and characters, may prohibit punctuation marks and/or certain words or phrases, and the like. Language models often struggle with such tasks, so while the naming requirements may be specified in the model prompts, they do not need to be. Instead, a post-processing step may evaluate the candidate names for compliance with the naming requirements. A human operator may select the best of multiple candidate micro-category names. Based on performance feedback, such as whether users select titles or items from a micro-category, a micro-category name may be replaced with another one for the micro-category.

In one or more embodiments, the model prompts may be multi-modal. For example, content titles may be associated with images such as movie/television posters, box art, album covers, and the like. Items may have images showing them. Such images data may be provided with the model prompt in addition to the cookies to allow for both semantic analysis and image context analysis in creating the micro-categories and micro-category names. In some embodiments, ordering the model prompt so that an image is before the text in the prompt may improve performance (e.g., in the filtering task).

In one or more embodiments, a subset of the generated micro-categories may be selected for presentation to a given user. A user interface may not fit every micro-category, and some users may be more likely to select items or titles from some micro-categories instead of from other micro-categories. Given a user's content title consumption or item purchase history, micro-categories may be selected for presentation to the user. For example, the micro-category 120 and the micro-category 130 may represent a subset of micro-categories generated by the machine learning of the system 100, and may be selected based on user preferences indicated by previous search, consumption, and/or purchase history.

In one or more embodiments, the theme generation model 106, the theme title/item filter model 108, and the micro-category naming model 110 may represent one model capable of performing each of the respective tasks described, or may represent separate models.

In one or more embodiments, the collection of titles/items per interest 104 may include a retrieval step for additional candidate titles or items. After the top-K most representative titles or items of a cluster have been identified, to allow for additional retrieval of representative titles or items, the collection step may explore related titles/items to include with the top-K group as inputs (e.g., via an input prompt) to the theme generation model 106. When using the graph-based clustering, the collection step may analyze nodes that neighbor the nodes selected as the top-K most representative to consider whether the neighboring nodes exhibit sufficient similarity to a top-K node to be included in the group (e.g., when the similarity score is greater than a threshold similarity score).

In one or more embodiments, the theme generation model 106, the them title/item filter model 108, and/or the micro-category naming model 110 (which may be one or multiple models) may be pre-trained using an unlabeled text corpus, for example. Unsupervised pre-training of the model(s) may result in one or multiple pre-trained model(s). The model(s) also may be fine-tuned based on a labeled dataset, which may be provided by human-in-the-loop data labeling for the tasks of the model(s). For example, the labeled dataset may train the micro-category naming model 110 to follow a naming style with specific naming rules. The fine-tuning dataset may be split into training data and validation data. Based on loss function values from the validation dataset, a human operator may select the best hyper-parameters for the model(s) in the fine-tuning. Test data show that with a small learning rate (e.g., 1.00E-06), training loss decreases with increased epoch number, but validation loss increases, suggesting that overfitting may occur with increasing epoch. Further testing shows that overfitting may occur around a learning rate of 5E-6. Example optimal hyper-parameters for the fine-tuning were selected as epoch=1 and learning rate=1E-6. For the thematic task, the model outputs provide significantly more details and have higher accuracy (e.g., semantic similarity between the model outputs and the annotation data) due to the fine-tuning. For the naming task, the fine-tuned model avoids a title: subtitle naming format in favor of simpler micro-category names.

Figure 2:
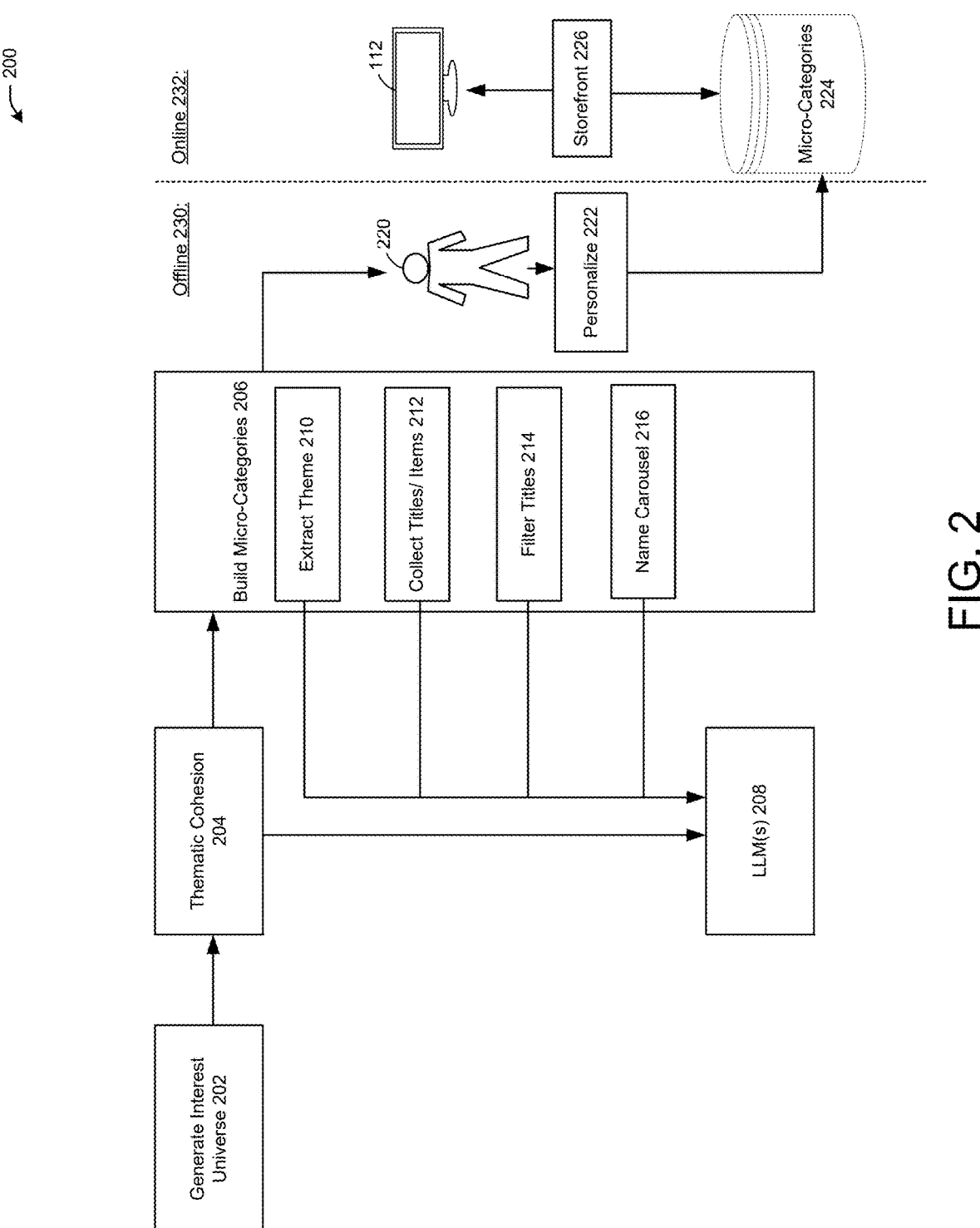
FIG. 2 illustrates an example process for machine-learning based micro-category generation, in accordance with one or more embodiments of the present disclosure.

FIG. 2 illustrates an example process 200 for machine-learning based micro-category generation, in accordance with one or more embodiments of the present disclosure.

Referring to FIG. 2, at step 202, the process 200 includes generating an interest universe. The process 200 may include identifying thematic cohesion 204 of titles/items in the interest universe. The process 200 may include building 206 micro-categories for titles/items based on the thematic cohesion 204. Determining thematic cohesion 204 and building micro-categories 206 may use one or more LLMs 208 (e.g., representing the theme generation model 106, the theme title/item filter model 108, and the micro-category naming model 110 of FIG. 1). Building the micro-categories 206 may include extracting a theme 210 of titles/items, collecting titles/items 212, filtering titles/items 214, and generating micro-category names (e.g., for a name carousel 216 presentable as interface data via the device 112).

Still referring to FIG. 2, a human operator 220 may personalize 222 the micro-categories for a given user. The personalization may include selecting micro-category names based on naming rules and performance of micro-category names (e.g., selection of titles/items in a micro-category for consumption/purchase), and selecting micro-categories for presentation to a user (e.g., based on previous search, consumption, and/or purchase history). The selected micro-categories and their names may be stored in a micro-categories storage 224, accessible to a storefront 226 (e.g., virtual storefront for a content providing or item selling application) whose interface data, including the micro-categories and their titles/items, may be presented using a device (e.g., the device 112).

Still referring to FIG. 2, steps 202-222 may occur offline 230, whereas the micro-categories storage 224, the storefront 226, and the presentation to the device 112 may occur online 232.

Figure 3:
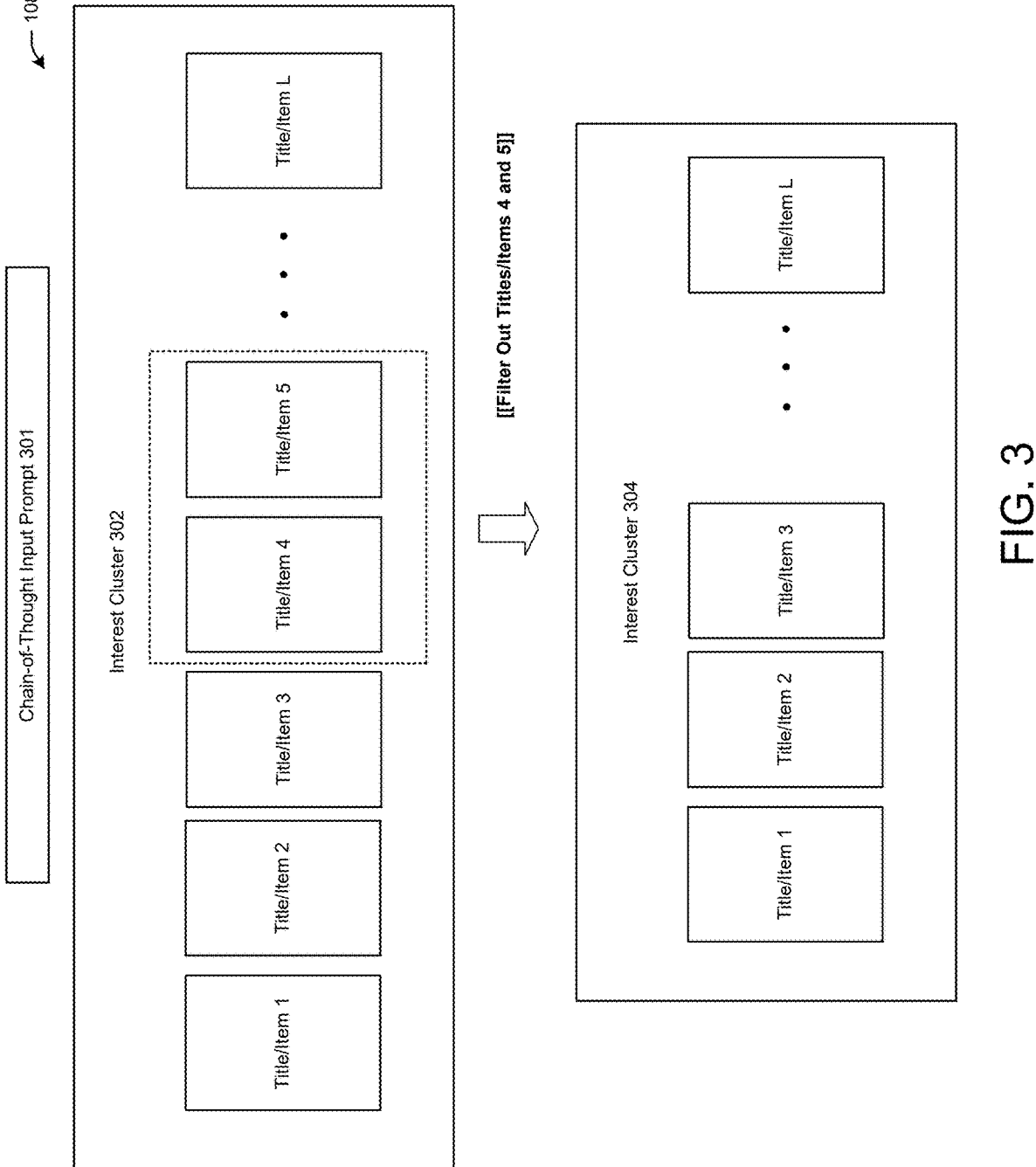
FIG. 3 illustrates an example thematic filtering of the theme title/item filter model of FIG. 1, in accordance with one or more embodiments of the present disclosure.

FIG. 3 illustrates an example thematic filtering of the theme title/item filter model 108 of FIG. 1, in accordance with one or more embodiments of the present disclosure.

Referring to FIG. 3, the theme title/item filter model 108 may be prompted with a CoT input prompt 301. The CoT input prompt 301 may ask the theme title/item filter model 108 to provide reasons about why a title in any interest cluster (e.g., titles 1-N in an interest cluster 302) matches or does not match a theme generated by the theme generation model 106. The CoT input prompt 301 may invoke explicit reasoning steps in the theme title/item filter model 108 response. The filtering decision of the theme title/item filter model 108 (e.g., filtering out title/item 4 and title/item 5 from the interest cluster 302 in the example shown in FIG. 3) may be conditioned on the reasoning prompted by the CoT input prompt 301. The resulting interest cluster 304 may include a subset of the titles/items of the interest cluster 302 in response to the filtering.

In one or more embodiments, there are multiple variants of the CoT input prompt 301, including zero-shot and few-shot. Few-shot CoT performs better than zero-shot.

Figure 4:
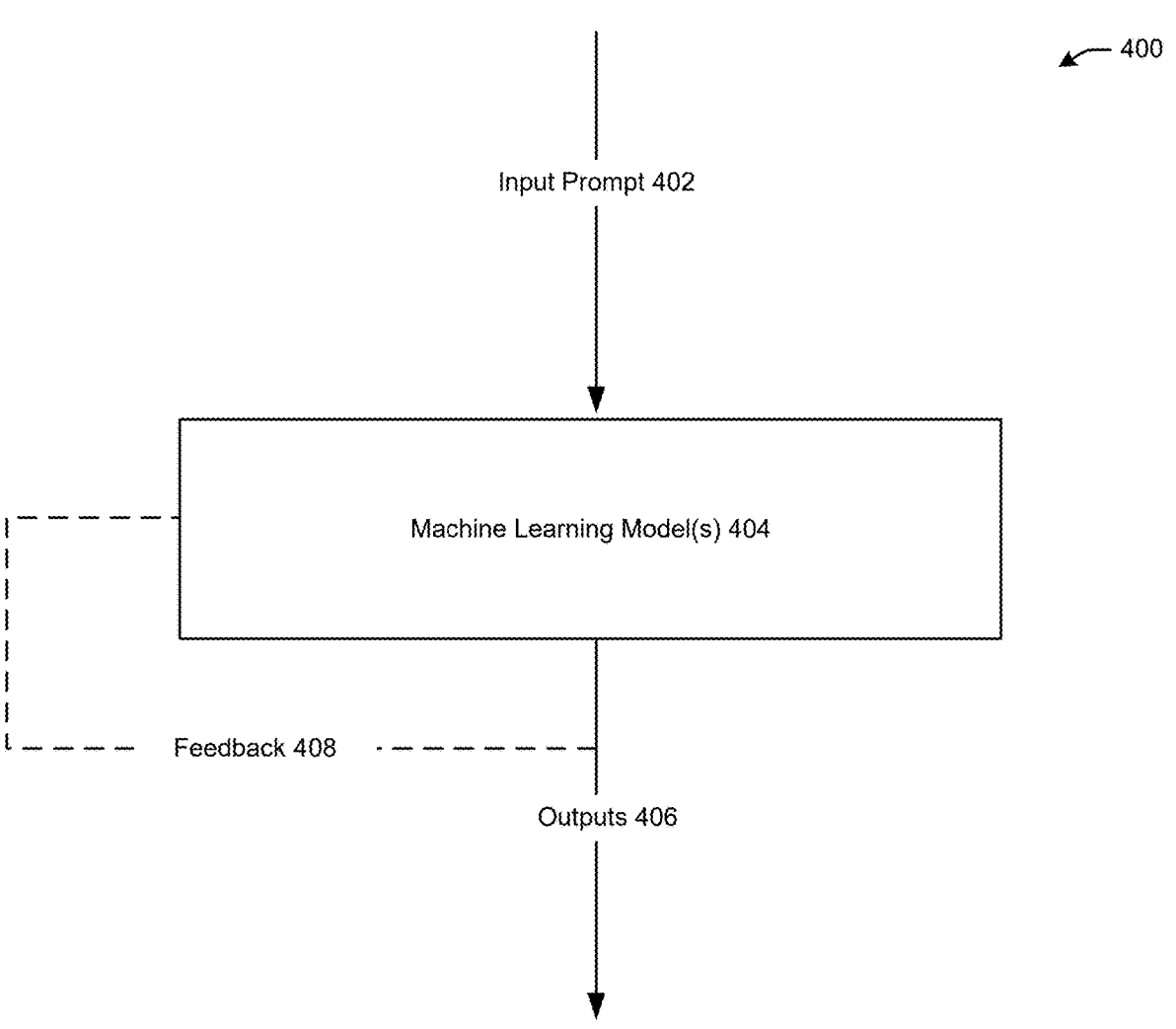
FIG. 4 illustrates example machine learning of the system of FIG. 1, in accordance with one or more embodiments of the present disclosure.

FIG. 4 illustrates example machine learning 400 of the system 100 of FIG. 1, in accordance with one or more embodiments of the present disclosure.

Referring to FIG. 4, an input prompt 402 may be input to one or more machine learning models 404 (e.g., representing the theme generation model 106, the theme title/item filter model 108, and/or the micro-category naming model 110 of FIG. 1, which may represent one or multiple ML models). Based on the input prompt 401, the machine learning model(s) 404 may generate outputs 406, including themes for micro-categories, titles/items of the micro-categories, names for the micro-categories, and reasoning for why titles/items are selected/filtered out of a micro-category.

In one or more embodiments, the representative titles or items in a cluster (e.g., closest to the center of a cluster) may represent seeds provided (e.g., in the input prompt 402) to the machine learning model(s) 404 to generate and name a theme (e.g., micro-category). For a given interest cluster, the top-K most representative titles or items may be provided in the input prompt 402 to the machine learning model(s) 404, reducing noise from tail items in a cluster (e.g., furthest from the center of a cluster) and limiting prompt length. To extract representative themes from a cluster (e.g., as shown in FIG. 3), the machine learning model(s) 404 needs sufficient knowledge about the representative titles or items in the cluster, and needs to understand what a theme means for a given domain, whether video titles, audio titles, items, etc. To provide knowledge for the seeds, cookie data may be appended to the input prompt 402 to the machine learning model(s) 404. A title or item cookie may include information such as a title or item name, a release year (for titles), a synopsis (for titles), and an item description (for items). The synopsis or item description may provide enough text data for the machine learning model(s) 404 to understand the semantics of a title or item. To help the machine learning model(s) 404 understand what a theme means, the input prompt 402 may include instructions. For example, for a video title theme prompt, the theme may include elements such as cultural context, topic, sub-genre, country of origin, mood, and unique character characteristics. An example video title prompt may be as follows:

"Pretend that you are a movie and television critic. Your task is to return a common underlying theme for a list of titles. The theme may include elements such as cultural context, topic, sub-genre, country of origin, mood, and unique character characteristics. The list of titles is below. Each title has a name, release year, and synopsis. If these titles share a common sub-genre or similar culture context, please highlight it. Otherwise, no need to mention it. Please be as specific as possible without totally discounting one of the given titles. If you are too general, you will miss what truly connects these titles. {title_cookie_1, title_cookie_2, . . . , title_cookie_K}."

In one or more embodiments, given a micro-category theme and a title or product, a task for the machine learning model(s) 404 is to determine if a title or item matches the theme. A micro-category theme may cover various aspects of a title or item. To derive an answer, the machine learning model(s) 404 may need to compare the theme to the title or item and evaluate for a match in terms of the aspects of the theme. This is a non-trivial reasoning task at which language models often struggle. The model's response may be binary (e.g., true or false), or a rating score (e.g., 0-4 where 0 indicates no match and 4 indicates a perfect match). When the response is false or below a score threshold for a given title or item, the given title or item may be filtered out from the micro-category. To assist the machine learning model(s) 404 in this reasoning task, cookie data and theme elements may be appended in the input prompt 402 to help the model understand the task. For example, a prompt template may be as follows:

"Pretend that you are an expert movie and television critic. Your task is to decide whether a title belongs to a given theme. If the title does not make sense when paired with the theme on a streaming service user interface, please return False. Otherwise, return True. The theme may include elements such as cultural context, topic, sub-genre, old release time period, country of in, character, studio, and mood. The theme and title are provided here. Please return either True or False in your answer. The theme is {theme}. The title (or item) is {title_cookie} (or {item_cookie})."

In one or more embodiments, another task of the machine learning model(s) 404 is to generate a representative name for a micro-category. The name should be reflective of the theme for the micro-category, and catchy to users. Multiple names may be generated by the machine learning model(s) 404 as candidates for a given micro-category. The prompt template for the input prompt 402 may be as follows:

"Theme: {theme}. Pretend that you are a film critic in the entertainment industry. Please provide a catchy name that would serve well as a title for a group of movies or television shows from this theme on a streaming service interface. Please limit your answer to ten words."

Micro-category names may be directly user-facing, so they should be catchy to users (e.g., consumers of the content or buyers of items), but also meet naming requirements. For example, naming requirements may limit the number of words and characters, may prohibit punctuation marks and/or certain words or phrases, and the like. Language models often struggle with such tasks, so while the naming requirements may be specified in the input prompt 402, they do not need to be. Instead, a post-processing step may evaluate the candidate names for compliance with the naming requirements. A human operator may select the best of multiple candidate micro-category names. Based on performance feedback 408, such as whether users select titles or items from a micro-category, a micro-category name may be replaced with another one for the micro-category.

In one or more embodiments, the input prompt 402 may be multi-modal. For example, content titles may be associated with images such as movie/television posters, box art, album covers, and the like. Items may have images showing them. Such images data may be provided with the model prompt in addition to the cookies to allow for both semantic analysis and image context analysis in creating the micro-categories and micro-category names. In some embodiments, ordering the input prompt 402 so that an image is before the text in the input prompt 402 may improve performance (e.g., in the filtering task).

Based on the metrics and observations for Table 1 above, an ICL (in-context learning) input prompt 402 (e.g., when the prompt provides examples of the task) may be preferred for succinct theme generation, and a CoT_json prompt may be used for thematic title filtering.

An example baseline filtering prompt for the input prompt 402 may be:

"You are an expert movie and TV critic. Your task is to decide whether a title belongs to a given theme. If the title does not make sense when paired with the theme on a streaming service UI, please return False. Otherwise, return True. The theme may include elements such as cultural context, topic, sub-genre, old release time period, country of origin, character, studio, and mood. The theme and title are provided here. Please return either True or False in your answer. The theme is: "Based on the given movie titles, release years, and synopses, it seems these films share a common theme of documenting the history and key figures of baseball, specifically focusing on iconic teams, players, and ballparks. The titles cover a range of baseball subjects, from biopics of star players like Babe Ruth and Lou Gehrig to retrospectives on legendary teams like the Brooklyn Dodgers and New York Yankees. Several films provide nostalgic looks back at historic ballparks like Yankee Stadium and Fenway Park. The docs appear to rely heavily on archival footage and interviews with former players to chronicle baseball's "golden age" from the early 1900s through the 1960s. While a few titles touch on more recent history or take a lighter approach, the overriding theme connecting these films is baseball history and nostalgia, bringing to life the stories, achievements and mythos surrounding the game's most celebrated teams, players and eras. Key subgenres represented include biopics, team/player profiles, ballpark retrospectives and sports nostalgia." The title is: Title Name, Title Release Year, Title Synopsis."

An example CoT prompt for the input prompt 402 may be:

"Question: You are an expert movie and TV critic. Your task is to decide whether a title belongs to a given theme. If the title does not make sense when paired with the theme on a streaming service user interface, it doesn't belong to the theme. The theme may include elements such as cultural context, topic, sub-genre, old release time period, country of origin, character, studio, and mood. The theme and title are provided here. The theme is: "Action-packed thrillers that take place on or around the Christmas holiday. While the main focus of the movie is an action, crime or thriller plot, Christmas should play a minor role to the narrative of the story." The title is: "Title Name: Title Release Year, Title Synopsis." Answer: Yes, the title belongs to the theme of action-packed thrillers that take place on or around the Christmas holiday. While the main focus of the movie is an action-comedy plot, Christmas does play a minor role in the narrative. The synopsis mentions Chris Cringle, also known as Santa Claus, being forced into a partnership and getting locked into a battle of wits. The mention of Chris Cringle and the Christmas-related elements indicate that the movie is set during the Christmas holiday, aligning with the theme."

An example json (JavaScript Object Notation) prompt for the input prompt 402 may be:

"You are an expert movie and tv critic. Your task is to decide whether a title belongs to a given theme. If the title does not make sense when paired with the theme on a streaming service UI, it doesn't belong to the theme. The theme may include elements such as cultural context, topic, sub-genre, old release time period, country of origin, character, studio, and mood. Please provide your response in a json format as shown in the examples below. The schema of the json is {" decision ": "string", "reason": "string"}. Example 1—input: The theme is: "Action-packed thrillers that take place on or around the Christmas holiday. While the main focus of the movie is an action, crime or thriller plot, Christmas should play a minor role to the narrative of the story." The title is: "Title Name, Title Release Year, Title Synopsis." Output: {"decision": "Yes", "reason": "The title belongs to the theme of action-packed thrillers that take place on or around the Christmas holiday. While the main focus of the movie is an action-comedy plot, Christmas does play a minor role in the narrative. The synopsis mentions Chris Cringle, also known as Santa Claus, being forced into a partnership and getting locked into a battle of wits. The mention of Chris Cringle and the Christmas-related elements indicate that the movie is set during the Christmas holiday, aligning with the theme."}."

An example rating method prompt for the input prompt 402 may be:

"You are an expert movie and TV critic. Your task is to classify how close a title is to a given theme. 0 means the title does not exhibit anything from the theme at all, 1 means the title had only a minor alignment with the essence of the theme, 2 means the title is moderately aligned with the essence of the theme, 3 means the title is majorly aligned with the essence of the theme and 4 means the title exhibits all the elements of the theme. The theme may include elements such as cultural context, topic, sub-genre, old release time period, country of origin, character, studio, and mood. The theme and title are provided here. Provide your output in the following json format: {" classificationCategory":"<fill in your categorization here>", "reason": "explain your reason here"}. The theme is: "Based on the given movie titles, synopses, and release years, it seems these films share a common theme of documenting the history and folklore of baseball in the United States, with a particular focus on iconic teams, players, and ballparks. Some more specific shared elements I noticed: —Several titles focus on the history of legendary MLB teams like the New York Yankees, Brooklyn Dodgers, and Boston Red Sox. —Multiple films highlight star players like Babe Ruth, Lou Gehrig, Ted Williams, and Reggie Jackson. —A few document the history of classic ballparks like Yankee Stadium and Fenway Park. —Most are nostalgic, reverent looks back at baseball's "golden age" from the early 1900s through the 1960s/70s. —The niche sub-genre seems to be baseball history documentaries, with a mix of biographical films, team histories, ballpark retrospectives, and folklore. Overall, baseball history, especially the legends and lore surrounding major teams, players, and stadiums, seems to be the common thread connecting these documentary titles. The niche is celebratory films looking back fondly on baseball's past glories."

As a result, the recommended input prompt 402, based on the above-describe test results, may be multi-modal for the thematic title/item filter task because of improved precision and recall metrics.

Image data in the input prompt 402 allows the machine learning model(s) 404 to pay attention to key details about a title or item, which improves the model's reasoning for title filtering.

FIG. 5 is a flow for an example process 500 for machine-learning based micro-category generation, in accordance with one or more embodiments of the present disclosure.

At block 502, a device (or system, e.g., including the components of FIG. 1, the micro-categories modules 619 of FIG. 6) may generate a graph of clusters of nodes representing content titles or items, and edges connecting the respective nodes. To generate the clusters, content titles that are frequently consumed together (or items frequently purchased together) may be grouped into a cluster using a graph-based clustering algorithm. In the graph, each node may represent a content title or item, and each edge connecting respective nodes may be weighted by a similarity score learned from an embedding model (e.g., trained using consumption/purchase history). There is no pre-set number of clusters, each representing an interest, to generate, so the interests represented by the clusters do not need to be preset. Because co-consumption and co-purchase data may change regularly, the similarities between co-consumed content and co-purchased items may change over time. A non-parametric community detection algorithm may be applied to allow for sparse soft-assignment without pre-specifying the number of clusters to generate. To account for the volatility, a pre-processing step for the graph may smooth the edge weights over time using time-decayed smoothing. To avoid noise from behavior data, a subset of representative content titles or items from a cluster may be selected for the cluster based on how close they are to the center of the cluster.

At block 504, the device may identify, for any respective cluster of the graph, a top-K most representative group of content titles or items. For a given interest cluster, the top-K most representative titles or items may be provided in a prompt to a machine learning model, reducing noise from tail items in a cluster (e.g., furthest from the center of a cluster) and limiting prompt length. To extract representative themes from a cluster, the model needs sufficient knowledge about the representative titles or items in the cluster, and needs to understand what a theme means for a given domain, whether video titles, audio titles, items, etc.

At block 506, the device may provide, to the machine learning model (e.g., the theme generation model 106 of FIG. 1) a first input prompt that includes the top-K most representative group, title cookies for the content titles or items in the top-K most representative group, and a first task of returning a common theme of the content titles or items in the top-K most representative group. To provide knowledge for the seeds, cookie data may be appended to the theme generation prompt to the model. A title or item cookie may include information such as a title or item name, a release year (for titles), a synopsis (for titles), and an item description (for items). The synopsis or item description may provide enough text data for the model to understand the semantics of a title or item. To help the model understand what a theme means, the prompt may include instructions. For example, for a video title theme prompt, the theme may include elements such as cultural context, topic, sub-genre, country of origin, mood, and unique character characteristics. The first input prompt may be multimodal, including both text and image data, for example.

At block 508, the device may generate, using the machine learning model, based on the first input prompt, the common theme of the top-K most representative group of content titles or items. The first input prompt may define examples of the common theme, such as cultural context, topic, sub-genre, country of origin, mood, and unique character characteristics, to help the model understand what characteristics of the content titles of items may be used to identify common themes among them.

At block 509, optionally, the device may retrieve additional content titles or items for inclusion in the top-K most representative group based on similarities between the additional content titles or items and the top-K most representative content titles or items. For example, the retrieval may correspond to the collection of titles/items per interest 104 of FIG. 1.

At block 510, the device may provide, the machine learning model (e.g., the theme title/item filter model 108), a second input prompt including the common theme, the title cookies for the content titles or items in the top-K most representative group, and a second task of determining whether the content titles or items match or do not match the common theme (e.g., and therefore should be filtered out of the group). A micro-category theme may cover various aspects of a title or item. To derive an answer, the language model may need to compare the theme to the title or item and evaluate for a match in terms of the aspects of the theme. This is a non-trivial reasoning task at which language models often struggle. To assist the model in this reasoning task, cookie data and theme elements may be appended in the second input prompt to help the model understand the task.

At block 512, the device may generate, using the machine learning model, based on the second input prompt, a group of content titles or items matching the common theme. This group may be a subset of the top-K group because one or more of the content titles or items may not match the common theme and be filtered out of the group.

At block 514, the device may provide, to the machine learning model (e.g., the micro-category naming model 110), a third input prompt including the group of content titles or items matching the common theme, the common theme, and a third task to generate a name for the group of content titles or items matching the common theme. A task of the micro-category naming model 110 is to generate a representative name for a micro-category. The name should be reflective of the theme for the micro-category, and catchy to users. Multiple names may be generated by the micro-category naming model 110 as candidates for a given micro-category. Micro-category names may be directly user-facing, so they should be catchy to users (e.g., consumers of the content or buyers of items), but also meet naming requirements. For example, naming requirements may limit the number of words and characters, may prohibit punctuation marks and/or certain words or phrases, and the like. Language models often struggle with such tasks, so while the naming requirements may be specified in the model prompts, they do not need to be. Instead, a post-processing step may evaluate the candidate names for compliance with the naming requirements.

At block 516, the device may generate, using the machine learning model, based on the third input prompt, one or more names for the group of content titles or items matching the common theme. A human operator may select the best of multiple candidate micro-category names. Based on performance feedback, such as whether users select titles or items from a micro-category, a micro-category name may be replaced with another one for the micro-category.

At block 518, the device may present the group of content titles or items matching the common theme and the name of the group of content titles matching the theme. Presentation may include generating user interface data to be presented using one or more user interfaces of an application (e.g., a streaming media application, retail application, etc.). The process 500 may generate multiple groups of content titles or items for any given application. Because the user interface may be limited in terms of presentation area with which to present the content titles or items, the most relevant content title or item groups and their titles may be selected for presentation give user preferences (e.g., content consumption habits, searches, purchase history, and/or the like). In this manner, the limited user interface presentation area may be optimized and customized for a user.

At block 520, the device may fine-tune the machine learning model. The fine-tuning may be supervised, for example, using a labeled dataset of samples. During fine-tuning, the weights of the model may be adjusted based on the labeled dataset so that the model may learn nuances and patterns specific to the target task (e.g., theme generation, filtering, and/or name generation).

The examples herein are not meant to be limiting.

Figure 6:
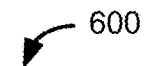
FIG. 6 illustrates a block diagram of an example machine upon which any of one or more techniques (e.g., methods) may be performed, in accordance with one or more example embodiments of the present disclosure.

FIG. 6 illustrates a block diagram of an example machine upon which any of one or more techniques (e.g., methods) may be performed, in accordance with one or more example embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more micro-category modules 619 (e.g., representing any of the components FIG. 1 and capable of performing the process 500 of FIG. 5), a network interface 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 620 may include one or more physical jacks (e.g., Ethernet, coaxial, or phone jacks) or one or more antennas to connect to the communications network 626. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for machine-learning based micro-category generation, the method comprising:

identifying, for a respective cluster of video titles, a subset of the cluster, the subset consisting of a top-K most representative group of video titles in the cluster;

providing, to a large language model (LLM), a first input prompt comprising the top-K most representative group, a first task of returning a common theme of the subset, and title cookies for the subset, wherein the first input prompt excludes at least one of the video titles in the cluster and not in the subset;

generating, by the LLM, based on the first input prompt, the common theme of the subset;

providing, to the LLM, a second input prompt comprising the common theme, the title cookies, and a second task of filtering out any respective video title of the subset that does not match the common theme;

generating, by the LLM, based on the second input prompt and the filtering, a group of video titles in the subset and matching the common theme;

providing, to the LLM, a third input prompt comprising the group of video titles matching the common theme, the common theme, and a third task to generate a name for the group of video titles based on the common theme;

generating, by the LLM, based on the third input prompt, a name for the group of video titles matching the common theme; and presenting the cluster of video titles and the name for the group of video titles matching the common theme via a user interface of a streaming video application.

2. The method of claim 1, wherein the title cookies comprise respective video title names, respective video title release years, and respective synopses indicative of semantics of the respective video title names.

3. The method of claim 1, wherein the second input prompt is a few-shot chain-of-thought (CoT) prompt associated with generating a rating score indicative of whether a respective video title matches or does not match the common theme.

4. The method of claim 1, wherein the first input prompt is a multimodal prompt further comprising box art images of the top-K most representative group, and wherein the common theme is further based on the box art images.

5. The method of claim 1, wherein the first input prompt is an in-context learning (ICL) prompt, and wherein the second input prompt is a chain-of-thought (CoT) JavaScript Object Notation (JSON) prompt.

6. A method for machine-learning based micro-category generation, the method comprising:

providing, to a generative artificial intelligence language model, a first input prompt comprising a most representative subset of a group of content titles or items sharing characteristics, a first task of returning a common theme of the subset, and textual information for the subset, wherein the first input prompt excludes at least one of the content titles or items in the group and not in the most representative subset;

generating, by the generative artificial intelligence language model, based on the first input prompt, the common theme of the subset; and causing presentation of the group and the common theme via a user interface of a device.

7. The method of claim 6, further comprising:

providing, to the generative artificial intelligence language model, a second input prompt comprising the common theme, the textual information, and a second task of filtering out any respective content title or item of the subset that does not match the common theme; and generating, by the generative artificial intelligence language model, based on the second input prompt and the filtering, a second group of content titles or items in the subset and matching the common theme, wherein the group of content titles or items presented via the user interface are the second group of content titles or items.

8. The method of claim 7, wherein the second input prompt is a few-shot chain-of-thought (CoT) prompt associated with generating a rating score indicative of whether a respective content title or item matches or does not match the common theme.

9. The method of claim 7, wherein the second input prompt requests the generative artificial intelligence language model to generate a reason for why any respective content title or item matches or does not match the common theme, the method further comprising:

generating, by the machine learning model, based on the second input prompt, the reason.

10. The method of claim 7, wherein the first input prompt is an in-context learning (ICL) prompt, and wherein the second input prompt is a chain-of-thought (CoT) JavaScript Object Notation (JSON) prompt.

11. The method of claim 7, further comprising:

providing, to the generative artificial intelligence language model, a third input prompt comprising the second group of content titles or items matching the common theme, the common theme, and a third task to generate a name for the second group of content titles or items based on the common theme; and generating, by the machine learning model, based on the third input prompt, a name for the second group of content titles or items matching the common theme, wherein the name is presented with the second group of content titles via an application.

12. The method of claim 11, further comprising:

generating, based on the third input prompt, a second name for the group of content titles or items matching the common theme;

providing, to the generative artificial intelligence language model, performance data indicative of performance of the name; and selecting, based on the performance data, the second name for the group of content titles or items matching the common theme.

13. The method of claim 6, wherein the content titles or items are streaming media titles, wherein the textual information comprises title cookies that comprise respective streaming media title names, respective streaming media title release years, and respective synopses indicative of semantics of the respective streaming media title names.

14. The method of claim 6, wherein the first input prompt is a multimodal prompt further comprising image data associated with the subset.

15. The method of claim 6, further comprising:

generating, using a graph-based clustering algorithm, a graph comprising clusters of nodes representing content titles and edges connecting respective nodes, wherein the edges represent a similarity score between two connected nodes;

applying a non-parametric community detection algorithm to the graph;

applying a time-decayed smoothing algorithm to the graph; and identifying a top-K most representative group based on the graph, the application of the non-parametric community detection algorithm to the graph, and the application of the time-decayed smoothing algorithm to the graph, wherein the subset of content titles or items sharing characteristics is the top-K most representative group.

16. The method of claim 6, wherein the first input prompt further comprises elements defining the common theme, the elements comprising a cultural context, a topic, a sub-genre, a country of origin, a mood, and unique character characteristics.

17. A system for machine-learning based micro-category generation, the system comprising:

at least one first processor associated with a generative artificial intelligence language model; and memory coupled to at least one second processor, wherein the at least one second processor is configured to:

provide, to the generative artificial intelligence language model, a first input prompt comprising a most representative subset of a group of content titles or items sharing characteristics, a first task of returning a common theme of the subset, and textual information for the subset wherein the first input prompt excludes at least one of the content titles or items in the group and not in the most representative subset;

generate, using the generative artificial intelligence language model, based on the first input prompt, the common theme of the subset; and cause presentation of the group and the common theme via a user interface of a device.

18. The system of claim 17, wherein the at least one processor is further configured to:

provide, to the generative artificial intelligence language model, a second input prompt comprising the common theme, the textual information, and a second task of filtering out any respective content title or item of the subset that does not match the common theme; and generate, using the generative artificial intelligence language model, based on the second input prompt and the filtering, a second group of content titles or items in the subset and matching the common theme, wherein the group of content titles or items presented via the user interface are the second group of content titles or items.

19. The system of claim 18, wherein the at least one processor is further configured to:

provide, to the generative artificial intelligence language model, a third input prompt comprising the second group of content titles or items matching the common theme, the common theme, and a third task to generate a name for the second group of content titles or items based on the common theme; and generate, using the generative artificial intelligence language model, based on the third input prompt, a name for the second group of content titles or items matching the common theme, wherein the name is presented with the second group of content titles via the application.

20. The system of claim 17, wherein the content titles or items are streaming media titles, wherein the textual information comprises title cookies that comprise respective streaming media title names, respective streaming media title release years, and respective synopses indicative of semantics of the respective streaming media title names.

\* \* \* \* \*